Patented Mar. 10, 1936

2,033,587

UNITED STATES PATENT OFFICE 2,033,587

ELECTRICAL STORAGE BATTERY

Richard Edgar Pearson, London, England, assignor to The D. & B. Electrical Company Limited, London, England No Drawing. Application December 5, 1934, Serial No. 756,183. In Great Britain December 5, 1933

4 Claims. (Cl. 136—78)

This invention relates to electrical storage cells and more particularly to the treatment of the positive plates of storage cells.

In the specification of my British Letters Patent No. 401,281 a method of treating the positive plates of an existing lead-acid cell is described, according to which, after the cell has been discharged and emptied and before it is refilled with acid the plates are treated with oxalic acid by spraying a 10 per cent solution as evenly as possible over them. The oxalic acid in the process above referred to is largely, if not entirely, consumed with a violent evolution of gaseous decomposition products.

According to the present invention positive plates in new cells or plates which have not yet been assembled into cells are treated in the course of manufacture. The pasted positive plates, with or without a preliminary treatment with sulphuric acid and with or without any short initial charge are subjected to the action of a solution of oxalic acid. The strength of the oxalic acid solution may vary, but 10% strength has proved satisfactory. The temperature of the acid bath may also vary and it has been found that improved results accrue by working at temperature slightly above room temperature, e. g. 40° C. The best method of treatment of the positive plates is to immerse the same wholly in an oxalic acid bath of the requisite strength and temperature.

After this first treatment, the plates may be at once subjected to the second treatment with dilute sulphuric acid and in particular with sulphuric acid of a strength suitable for use as electrolyte in a lead-acid cell. A second evolution of gas then takes place and the plates are now ready for assembly in a cell which is charged in the ordinary manner. Alternatively after the oxalic acid treatment the plates, which dry off very quickly, can be stored or transported and then, when required assembled in cells and dipped in the sulphuric acid electrolyte. The second gassing is at once produced and the improved effects obtainable in accordance with the invention result.

The process may also be carried out by incorporating small quantities of oxalic acid or alkali carbonates, such as sodium carbonate or potassium carbonate with the paste mixture prior to or during the manufacture of the positive plates. When a positive plate prepared in such a manner is immersed in the sulphuric acid a violent gassing takes place, which with the knowledge at present at my disposal I consider a particular feature of the present invention.

Similar results can be obtained from positive plates, as at present manufactured, by replacing the oxalic acid by substances which will also cause the evolution of a gas at the surface of the plate, such as for example dilute formic acid, lactic acid, malonic acid, tartaric acid or hydrochloric acid or hydrogen peroxide. Alternatively the plates may be treated first with dilute sulphuric acid, then with sodium carbonate solution or the like, followed by a second treatment with sulphuric acid.

In selecting the material suitable for carrying out the invention, care must be taken to avoid such reagents as will be electrolytically decomposed during the subsequent charging of the cell so as to produce substances such as nitric acid or chlorine, which will attack the plates or cause the deposition of another metal or oxide on the negative plates; when hydrochloric acid is employed, a thorough subsequent washing with water is recommended.

It appears that the foregoing treatment has the effect of increasing the reactivity of the positive plates with the electrolyte so that after a discharge sufficient to reduce the voltage across the plates the cell will recover more rapidly than a cell whose plates have not been so treated. Moreover, the tendency for lead sulphate to form an incrustation on the positive plate also appears to be retarded or inhibited and the efficiency of the cell in use is increased considerably.

It is to be understood that although the invention is primarily concerned with the treatment of plates during manufacture the process outlined will be found effective for the treatment of used plates when in unchanged condition.

What I claim and desire to secure by Letters Patent is:—

1. A process for manufacturing positive plates for lead acid storage batteries consisting in first pasting the plates with lead peroxide paste, and then treating the plates with oxalic acid to effect liberation of carbonic acid gas and the formation of a lead carbonate compound to effect the binding of the paste into a strong crystalline structure.

2. A process for manufacturing positive plates for lead acid storage batteries consisting in first pasting the plates with lead peroxide paste, then treating the plates with oxalic acid to effect liberation of carbonic acid gas and the formation of a lead carbonate compound to effect the binding of the paste into a strong crystalline structure, and then treating the plates with dilute sulphuric acid to effect decomposition of the carbonate compound whereby carbon-dioxide gas is again liberated and lead sulphate formed to effect the binding of the paste into a crystalline structure.

3. The process for manufacturing positive plates for lead acid storage batteries which consists in pasting the plates with lead peroxide paste, and then treating the pasted plates with a reagent of the group consisting of oxalic acid, formic acid, lactic acid, malonic acid, and tartaric acid to effect liberation of carbon dioxide and to cause the formation of a lead compound having a crystalline structure.

4. The process for manufacturing positive plates for lead acid storage batteries which consists in pasting the plates with lead peroxide paste, then treating the pasted plates with a reagent of the group consisting of oxalic acid, formic acid, lactic acid, malonic acid, and tartaric acid to effect liberation of carbon dioxide and to cause the formation of a lead compound having a crystalline structure, and then treating the plates with sulphuric acid to decompose the lead compound but leaving the body of the paste in a crystalline structure.

RICHARD EDGAR PEARSON.